Feb. 3, 1931.  J. I. PASCAL  1,791,010
OPTICAL EXAMINATION APPARATUS
Filed July 19, 1928    2 Sheets-Sheet 1
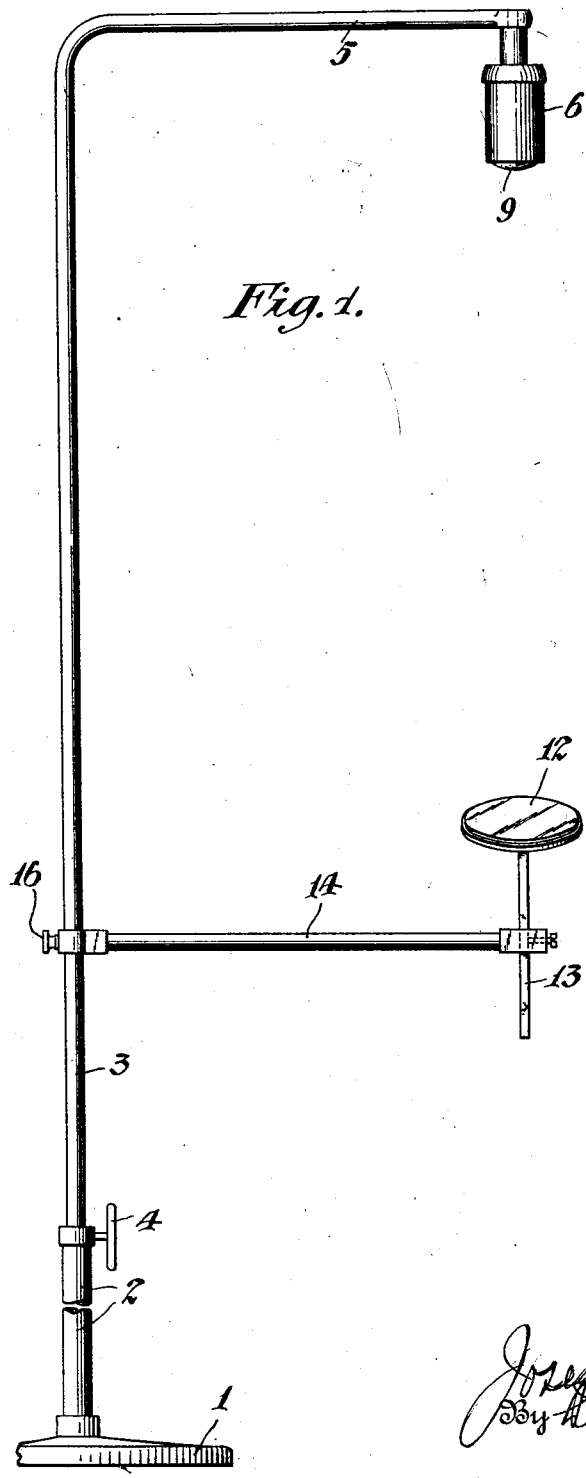
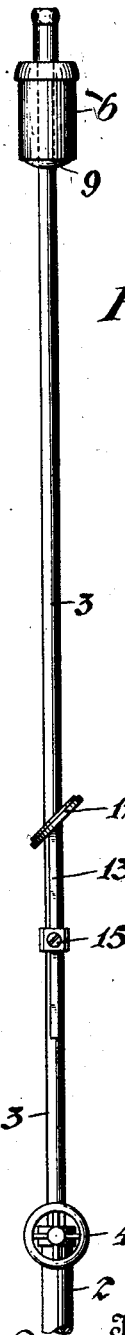

Feb. 3, 1931.  J. I. PASCAL  1,791,010
OPTICAL EXAMINATION APPARATUS
Filed July 19, 1928  2 Sheets-Sheet 2
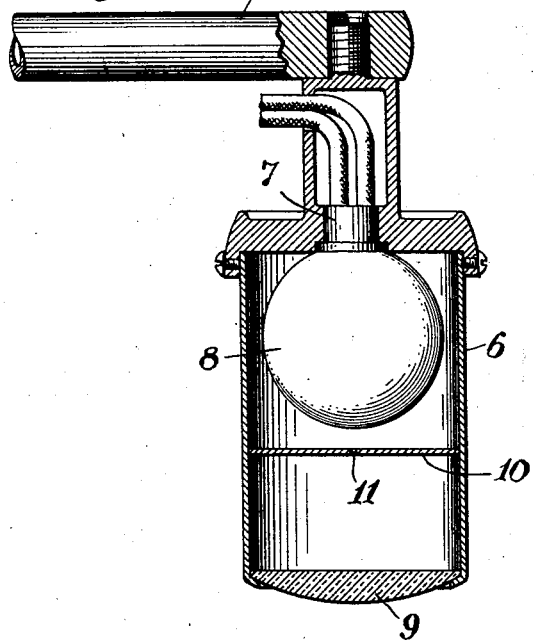
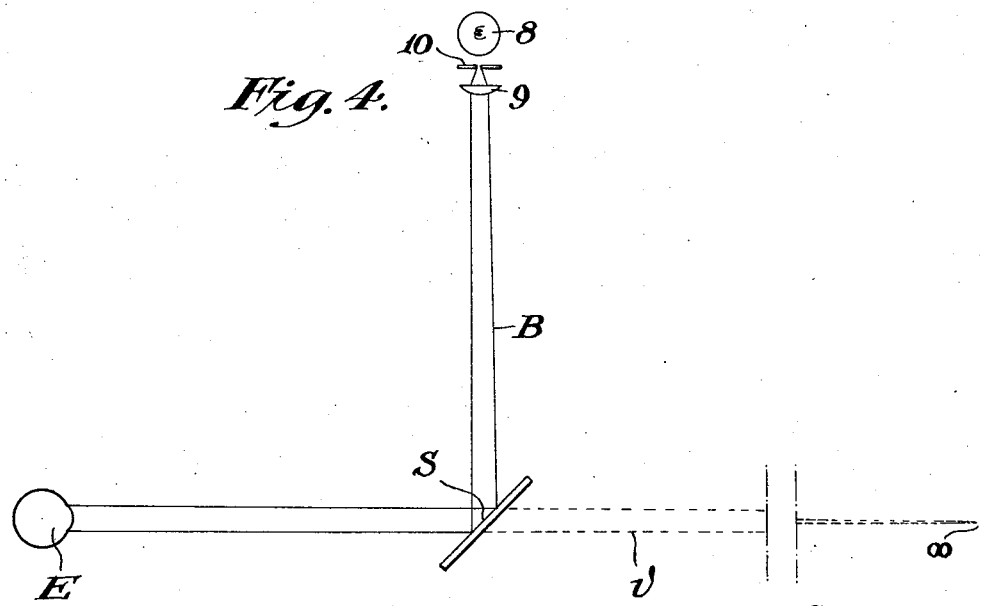

Patented Feb. 3, 1931

1,791,010

UNITED STATES PATENT OFFICE

JOSEPH I. PASCAL, OF NEW YORK, N. Y.

OPTICAL-EXAMINATION APPARATUS

Application filed July 19, 1928. Serial No. 293,874.

My invention relates to an appliance for use in retinoscopy, ophthalmoscopy, or other ocular examination or treatment.

The general object is to provide means, or an appliance, which provides definite, passive relaxed and unobstructed fixation for the patient, and direct, independent observation for the examiner, allowing him to test the eye ground in the immediate region of the fovea centralis; and which will in a relatively small room or space, provide a light-spot for observation by the patient, which has the appearance or effect of a light or "fixation point" located at a much greater distance, or sufficiently distant to produce practically "infinite" optical focus by the patient, with complete relaxation of accommodation and convergence.

When an ordinary white light or object is directly observed, it must, in order to produce the desired optical effect upon the patient, be located about 20 feet from his eye, and this is impracticable in examination rooms of ordinary, small room or compartment type. Observation of the eye by the examiner is also facilitated by working practically in line with the patient's line of vision.

I have found that a blue-violet fixation light due to the chromatic aberration of the eye, greatly increases the apparent fixation distance, as compared with ordinary or "white" light; that the focusing of the light through a suitable (usually convex) lens, (usually with a small "aperture" between the lamp and lens) further increases the apparent fixation distance; and also that placing the lens at a distance from the exact focal distance of the lens, further tends to increase the apparent fixation distance.

In making my apparatus in a preferred form, I take advantage of some or all of these discoveries and also provide a mirror angularly arranged with respect to the light source and the patient's line of vision, so that the total actual distance of the light from the eye is made up of the distance from the light to the mirror and that from the mirror to the eye. Thus, when the light is above the mirror, as is most convenient, a large part of the total space required is vertical, so that the examination may be made in a very small compartment. The mirror is also preferably of small size, and the examiner may therefore "work" from behind it, in any convenient position, and without "distracting" the patient's vision or getting between the light-source and the mirror or the mirror and the patient's eye, as will be understood by eye examiners.

Preferably, also, I arrange the essential parts, namely the lamp, with or without a lens, and the mirror, as an operative unit, with suitable adjustment features, as later referred to.

The characteristics and advantages of the invention are further sufficiently explained in connection with the following detail description of the accompanying drawings, which shows one preferred embodiment. After considering this example, skilled persons will understand that many variations may be made, and I contemplate the employment of any structures that are properly within the scope of the appended claims.

In the drawings:

Fig. 1 is a side elevation of apparatus embodying the invention in one form.

Fig. 2 is a front elevation.

Fig. 3 is a sectional view, enlarged, of the lamp casing, lamp, diaphragm and lens.

Fig. 4 is an explanatory diagram.

In Figs. 1 and 2, a base 1 provides floor support for a hollow column 2, in which a vertical rod 3 is slidably mounted, and secured in desired position by a set screw 4. Or, the instrument may be attached to a wall or chair instead of resting on the floor base. At the upper end of the rod is a horizontal arm 5, at the end of which is any suitable lamp casing 6, provided with a socket 7 in which is an incandescent lamp 8, the bulb of which is so composed or tinted as to produce the desired blue-violet light. Or, I may use an ordinary frosted bulb with a piece of blue-violet glass beneath. In the lower end of the casing is, preferably, a convex lens 9, although the lens may be omitted in some cases. Preferably, also, I place between the lamp and the lens a diaphragm 10 having a small, central light aperture 11. The lens is preferably located slightly closer to or farther from the lamp than the exact focal distance. This has the effect of making the light beam slightly divergent or convergent, respectively. The focusing of the light beam by a lens producing approximately "parallel" beam, the "light spot" of which, as observed in the mirror, has the appearance of being much farther away than it actually is, and farther than it would appear to be when produced by an unfocused beam. The slight displacement of the lens from exact focal position as referred to above, and especially when arranged to produce a convergent beam, has a decided relaxing effect upon the ciliary muscle tending to increase relaxation of "accommodation."

A small mirror 12 is set, usually at an angle of 45°, on the upper end of rod 13. This rod is slidably mounted in the end of an arm 14 and secured in vertically adjusted position by a set screw 15. Arm 14 is supported by, and vertically adjusted on, rod 3, and is secured in adjusted position by a set screw 16. The adjustments at 15 and 16 may be omitted, in some cases.

The mirror is adjusted vertically to the level of the patient's eyes, or to that of the examiner's eyes, in his normal working position, and thereafter may remain in the same position if the patient is seated so as to bring his eyes to the mirror level. The lamp case is adjusted in relation to the mirror to give the desired actual fixation distance, when added to the distance from the mirror to the patient's eyes. The last named distance may be quite small, enabling the examiner to work quite close to the patient.

Fig. 4 shows diagrammatically, in elevation, one preferred arrangement. The patient's eye E is at the level of the mirror, in which he observes a light spot S produced by a beam B from the blue-violet lamp, or ordinary frosted bulb with a blue-violet glass beneath, through the focusing lens. Although the mirror is shown as at the midpoint of the total actual fixation distance, the distance E—S may in one particular example be 14", and the distance from the lamp to the mirror, 26", making a total actual fixation distance of only 40"; but by the combined effects of the blue-violet light and the focusing lens, as sufficiently explained above, the fixation distance apparent to the patient corresponds to a "white" fixation distance of about 20', or, practically infinity, with respect to optical focus, this apparent fixation vision of the patient being represented by the dotted lines $v$, terminating at imaginary infinity, as indicated by the mathematical symbol $\infty$.

The various adjustments and modes of use, and their advantages, will be understood by eye examiners, without further explanation.

I claim:

1. Optical examination apparatus for use in connection with retinoscopes or the like comprising a mirror in the path of vision of the patient being examined, a light of a color having a short wave length, said light lying out of the path of vision of the patient and reflected in the mirror to act as a fixation target for the patient, said light producing a relaxation of the patient's eye due to the fact that the chromatic aberration of the eye causes a light of short wave length at a relatively short distance to produce a relaxation effect equal to that produced by a white light at a longer distance.

2. Optical examination apparatus for use in connection with retinoscopes or the like comprising a mirror in the path of vision of the patient being examined, a blue-violet light lying out of the path of vision of the patient and reflected in the mirror to act as a fixation target for the patient, the total light-path from the blue-violet light to the patient's eye being considerably less than twenty feet but having the relaxation effect on the patient's eye of a white target at a distance of twenty feet, due to the chromatic aberration of the patient's eye.

3. Optical examination apparatus for use in connection with retinoscopes or the like comprising a mirror in the path of vision of the patient being examined, a blue-violet light lying out of the path of vision of the patient and reflected in the mirror to act as a fixation target for the patient, the total light-path from the blue-violet light to the patient's eye being approximately forty inches but having the relaxation effect on the patient's eye of a white target at optical infinity due to the chromatic aberration of the patient's eye.

4. Optical examination apparatus for use in connection with retinoscopes or the like comprising a mirror in the path of vision of the patient being examined, a light lying out of the path of vision of the patient and reflected in the mirror to act as a fixation target for the patient, and a convex lens in the light-path between the light and the patient's eye, thereby producing a relaxation of the patient's eye due to an apparent fixation distance much greater than the total length of the light-path from the light to the patient's eye.

5. Optical examination apparatus for use in connection with retinoscopes or the like comprising a mirror in the path of vision of the patient being examined, a light lying out of the path of vision of the patient and reflected in the mirror to act as a fixation target for the patient, and a convex lens in the light-path between the light and the patient's eye so arranged as to produce a converging beam and producing a relaxation of the patient's eye due to an apparent fixation distance much greater than the total length of the light-path from the light to the patient's eye.

6. Optical examination apparatus for use in connection with retinoscopes or the like comprising a mirror in the path of vision of the patient being examined, a light lying out of the path of vision of the patient and reflected in the mirror to act as a fixation target for the patient, a tube having a diaphragm provided with a relatively small opening, the light being directed to pass through the tube and diaphragm on its way to the patient's eye, thereby producing a relaxation of the patient's eye due to an apparent fixation distance much greater than the total length of the light-path from the light to the patient's eye.

7. Optical examination apparatus for use in connection with retinoscopes or the like comprising a mirror in the path of vision of the patient being examined, a light of a color having a short wave length, said light lying out of the path of vision of the patient and reflected in the mirror to act as a fixation target for the patient, and a focusing lens between the light and the mirror, thereby producing with a relatively short light-path from the light to the patient's eye a relaxation effect equal to that produced by a white light at optical infinity.

8. Optical examination apparatus for use in connection with retinoscopes or the like comprising a mirror in the path of vision of the patient being examined, a light of a color having a short wave length, said light lying out of the path of vision of the patient and reflected in the mirror to act as a fixation target for the patient, and a focusing lens between the light and the mirror so arranged as to produce a converging beam and producing a relaxation of the patient's eye due to an apparent fixation distance much greater than the total length of the light-path from the light to the patient's eye.

9. Optical examination apparatus for use in connection with retinoscopes or the like comprising a mirror in the path of vision of the patient being examined, a blue-violet light lying out of the path of vision of the patient and reflected in the mirror to act as a fixation target for the patient, and a focusing lens between the light and the mirror, thereby producing with a relatively short light-path from the light to the patient's eye a relaxation effect equal to that produced by a white target at optical infinity.

10. Optical examination apparatus for use in connection with retinoscopes or the like comprising a mirror in the path of vision of the patient being examined, a blue-violet light lying out of the path of vision of the patient and reflected in the mirror to act as a fixation target for the patient, and a convex lens between the light and the mirror so arranged as to produce a converging beam and producing a relaxation of the patient's eye due to an apparent fixation distance much greater than the total length of the light-path from the light to the patient's eye.

11. Optical examination apparatus for use in connection with retinoscopes or the like comprising a mirror in the path of vision of the patient being examined, a light lying out of the path of vision of the patient and reflected in the mirror to act as a fixation target for the patient, a tube having a diaphragm provided with a relatively small opening, the light being directed to pass through the tube and diaphragm on its way to the patient's eye, and a convex lens in the light-path between the light and the patient's eye, thereby producing a relaxation of the patient's eye due to an apparent fixation distance much greater than the total length of the light-path from the light to the patient's eye.

12. Optical examination apparatus for use in connection with retinoscopes or the like comprising a mirror in the path of vision of the patient being examined, a blue-violet light lying out of the path of vision of the patient and reflected in the mirror to act as a fixation target for the patient, a tube having a diaphragm provided with a relatively small opening, the light being directed to pass through the tube and diaphragm on its way to the patient's eye, and a focusing lens between the light and the mirror, thereby producing with a relatively short light-path from the light to the patient's eye a relaxation effect equal to that produced by a white light at optical infinity.

13. Optical examination apparatus for use in connection with retinoscopes or the like comprising a mirror in the path of vision of the patient being examined, a blue-violet light lying out of the path of vision of the patient and reflected in the mirror to act as a fixation target for the patient, a tube having a diaphragm provided with a relatively small opening, the light being directed to pass through the tube and diaphragm on its way to the patient's eye, and a convex lens between the light and the mirror so arranged as to produce a converging beam, thereby producing a relaxation of the patient's eye due to an apparent fixation distance much greater than the total length of the light-path from the light to the patient's eye.

14. Optical examination apparatus for use in connection with the retinoscopes or the like comprising a standard, a light of a color having a short wave length supported by the standard, a mirror supported by the standard, a diaphragm having a small aperture located between the light and the mirror, a convex lens located between the light and the mirror, the mirror being adapted to deflect the light waves coming from the light toward the eye of the patient being examined.

In testimony whereof I affix my signature.

JOSEPH I. PASCAL.